(12) United States Patent
Kim

(10) Patent No.: US 11,437,028 B2
(45) Date of Patent: Sep. 6, 2022

(54) METHOD AND APPARATUS FOR SOUND ANALYSIS

(71) Applicant: LG ELECTRONICS INC., Seoul (KR)

(72) Inventor: Dahae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 75 days.

(21) Appl. No.: 16/993,133

(22) Filed: Aug. 13, 2020

(65) Prior Publication Data

US 2021/0065697 A1 Mar. 4, 2021

(30) Foreign Application Priority Data

Aug. 29, 2019 (KR) .................. 10-2019-0106666

(51) Int. Cl.
*G10L 15/20* (2006.01)
*G10L 15/06* (2013.01)
*G10L 15/22* (2006.01)
*G10L 25/84* (2013.01)

(52) U.S. Cl.
CPC .......... *G10L 15/20* (2013.01); *G10L 15/063* (2013.01); *G10L 15/22* (2013.01); *G10L 25/84* (2013.01)

(58) Field of Classification Search
CPC ....... G10L 15/20; G10L 15/063; G10L 15/22; G10L 25/84
USPC ........................................................ 704/233
See application file for complete search history.

(56) References Cited

U.S. PATENT DOCUMENTS

| | | | | |
|---|---|---|---|---|
| 9,813,811 B1 * | 11/2017 | Sun | ............... | G10L 21/0272 |
| 9,992,585 B1 * | 6/2018 | Recker | ............... | H04R 25/407 |
| 2004/0179696 A1 * | 9/2004 | Ohta | ............... | H04S 7/307 |
| | | | | 381/61 |
| 2011/0238407 A1 * | 9/2011 | Kent | ............... | G10L 15/26 |
| | | | | 704/3 |
| 2017/0019735 A1 * | 1/2017 | Song | ............... | H04S 7/301 |

FOREIGN PATENT DOCUMENTS

| | | | | |
|---|---|---|---|---|
| KR | 100397402 B1 * | 12/2003 | ............ | G10L 15/08 |
| KR | 100397402 B1 * | 12/2003 | ............ | G10L 15/08 |
| KR | 10-2012-0102306 | 2/2013 | | |
| KR | 10-1592425 | 2/2016 | | |

OTHER PUBLICATIONS

P. Esling and C. Agon, "Multiobjective Time Series Matching for Audio Classification and Retrieval," in IEEE Transactions on Audio, Speech, and Language Processing, vol. 21, No. 10, pp. 2057-2072, Oct. 2013, doi: 10.1109/TASL.2013.2265086. (Year: 2013).*

* cited by examiner

*Primary Examiner* — Bharatkumar S Shah
(74) *Attorney, Agent, or Firm* — Lee, Hong, Degerman, Kang & Waimey PC

(57) ABSTRACT

Disclosed is a sound analysis method and apparatus which execute an installed artificial intelligence (AI) algorithm and/or a machine learning algorithm and are capable of communicating with other electronic devices and servers in a 5G communication environment. The sound analysis method and apparatus provide a sound learning model specialized for a sound environment of a target space.

15 Claims, 5 Drawing Sheets

METHOD AND APPARATUS FOR SOUND ANALYSIS

CROSS-REFERENCE TO RELATED APPLICATION

Pursuant to 35 U.S.C. § 119(a), this application claims the benefit of earlier filing date and right of priority to Korean Patent Application No. 10-2019-0106666, filed on Aug. 29, 2019, the contents of which are hereby incorporated by reference herein in its entirety.

BACKGROUND

1. Technical Field

The present disclosure relates to a sound analysis method and apparatus, and more particularly, to a sound analysis method and apparatus for extracting a repeated sound pattern in a target space and learning the extracted sound pattern.

2. Description of Related Art

Recently, with the proliferation of artificial intelligence (AI) technology and Internet of Things (IoT) technology, the application field of voice recognition technology has been widened and voice recognition systems are being applied in various environments.

A spatial sound environment affects the performance of voice recognition. For example, when a spatial environment changes, the level, type and audio waveform of surrounding noise may vary. Therefore, a sound model which is suitable for a sound environment in which a voice recognition system is applied is required in order to improve the performance of voice recognition.

Related Art 1 (Korean Patent Application Laid-open Publication No. 10-2012-0102306 A) discloses a voice processing device and method for enhancing a signal of a user oriented toward a voice processing device in a noise environment. According to Related Art 1, only a target signal is enhanced by removing, from mixed signals generated from a plurality of sound sources, signals generated from sound source directions except for a preset sound source direction.

Related Art 2 (Korean Patent Registration No. 10-1592425 B1) discloses a voice preprocessing device for improving a voice recognition rate by removing noise in a noise environment in a vehicle. According to Related Art 2, parameters of a noise reduction algorithm are updated on the basis of reverberation parameters set according to a change in a noise environment in a vehicle.

However, since Related Art 1 and Related Art 2 use a single noise model, variations in the characteristics and type of noise according to a spatial sound environment are not taken into account.

SUMMARY OF THE INVENTION

An aspect of the present disclosure is to resolve the problems of the related art in which a voice recognition error may occur since variations in the characteristics and type of noise according to a spatial sound environment are not taken into account for a voice recognition service.

Another aspect of the present disclosure is to provide a sound learning model specialized for a sound environment of a target space.

The technical problems to be solved by the present disclosure are not limited to the above problems, and other technical problems would be clearly understood by those skilled in the art from the following description.

To resolve the above problems, a sound analysis method according to an embodiment of the present disclosure provides a sound learning model suitable for a target space by extracting and learning a repeated sound pattern from an input sound obtained from the target space.

In detail, the sound analysis method may comprise obtaining an input sound generated in a target space, generating a first set of sub sounds by dividing the input sound according to a first predetermined time interval, determining at least one repeated matching relationship between repeated sub sounds of the first set of sub sounds based on similarity, extracting a repeated sound pattern generated in the target space based on the determined at least one repeated matching relationship, and training a sound learning model for the target space using the repeated sound pattern.

To resolve the above problems, a sound analysis apparatus according to an embodiment of the present disclosure may comprise a microphone, which obtains an input sound generated in a target space, a memory, which stores a sound learning model, and a processor.

In detail, the processor may be configured to generate a first set of sub sounds by dividing the input sound according to a first predetermined time interval, determine at least one repeated matching relationship between repeated sub sounds of the first set of sub sounds based on similarity, and extract a repeated sound pattern generated in the target space based on the determined at least one repeated matching relationship.

The solutions to the technical problems to be solved by the present disclosure are not limited to the above solutions, and other solutions would be clearly understood by those skilled in the art from the following description.

BRIEF DESCRIPTION OF THE DRAWINGS

The above and other aspects, features, and advantages of the present disclosure will become apparent from the detailed description of the following aspects in conjunction with the accompanying drawings, in which.

DETAILED DESCRIPTION

Figure 1:
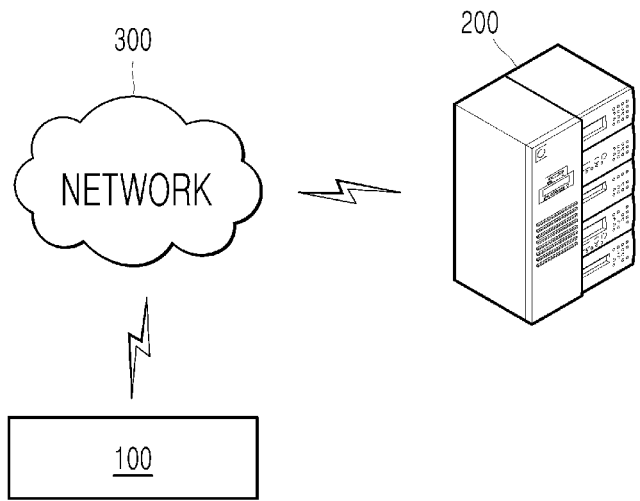
FIG. 1 is an exemplary diagram of a sound analysis environment according to an embodiment.

Hereinafter, an embodiment disclosed herein will be described in detail with reference to the accompanying drawings, and the same reference numerals are given to the same or similar components and duplicate descriptions thereof will be omitted. Also, in describing an embodiment disclosed in the present document, if it is determined that a detailed description of a related art incorporated herein unnecessarily obscure the gist of the embodiment, the detailed description thereof will be omitted.

The terms used in this application is for the purpose of describing particular embodiments only and is not intended to limit the disclosure. As used herein, the singular forms "a," "an," and "the" may be intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof. Although the terms "ordinal numbers" such as first, second and the like are used to describe various structural elements, the structural elements should not be defined by the terms. These terms are generally only used to distinguish one element from another.

The concept of the present disclosure will be described before describing embodiments of the present disclosure.

Since pieces of sound information are generated simultaneously, a noise may be considered as data or data may be considered as a noise according to a purpose. In detail, a voice of a human being is important data and other sounds are treated as a noise when analyzing conversation contents. On the other hands, the other sounds may be important data and the voice of a human being may be treated as a noise when analyzing situation information. However, since an environment or condition in which a noise is generated or a noise type varies according to a space where the noise is created, it is difficult to perform sound analysis through a single model. This is because even a conversation having the same contents may be filtered as a noise or may be treated as meaningful data depending on a surrounding situation or a noise reduction technique.

Therefore, it is necessary to develop a preprocessing technology for correctly distinguishing noise/data before analyzing audio data.

In general, various characteristics of audios, such as the type and level of a sound, a frequently generated sound, or the like, vary according to a space where the sound in created. Therefore, it may be difficult to correctly differentiating noise/data when a microphone is present in a fixed location. To this end, it is necessary to develop a sound analysis method and apparatus for effectively learning a sound generated in a corresponding space and accurately eliminating a noise in consideration of a repeated sound pattern in the corresponding space by arranging a separate microphone in each space rather using a single microphone. A sound analysis method and apparatus according to an embodiment provides preprocessing for correctly distinguishing noise/data for a sound environment of a target place.

FIG. 1 is an exemplary diagram of a sound analysis environment according to an embodiment.

The sound analysis environment may comprise a sound analysis apparatus 100, a server 200, and a network 300. The sound analysis apparatus 100 and the server 200 may be connected to each other in a 5G communication environment. In addition, other than the devices illustrated in FIG. 1, various other electronic devices for use at a home or an office may be connected to each other and operate in an Internet-of-Things environment.

The sound analysis apparatus 100 obtains an input sound in various target spaces and analyzes the obtained sound. For example, the sound analysis apparatus 100 may include various electronic devices capable of performing a voice recognition function, such as an artificial intelligence (AI) speaker, a communication robot, or the like. For example, the sound analysis apparatus 100 may be, but is not limited to, a desktop computer, smartphone, notebook, tablet PC, smart TV, cell phone, personal digital assistant (PDA), laptop, media player, micro server, global positioning system (GPS) device, electronic book terminal, digital broadcast terminal, navigation device, kiosk, MP3 player, digital camera, home appliance, and other mobile or immobile computing devices. Furthermore, the sound analysis apparatus 100 may be a wearable device having a communication function and a data processing function, such as a watch, glasses, a hair band, a ring, or the like. For example, the sound analysis apparatus 100 may include various home appliances capable of performing a voice recognition function, such as a TV, a washing machine, an air conditioner, or the like. Furthermore, the sound analysis apparatus 100 may serve as a hub for controlling an electronic device having no voice input/output function.

The sound analysis apparatus 100 itself may perform a sound analysis function, or may transmit an input sound or target sound to the server 200 and may receive a sound analysis result from the server 200. The sound analysis apparatus 100 may increase accuracy of a voice recognition service using repeated sound pattern information determined as a result of sound analysis.

The server 200 may be a database server, which provides big data required for applying a variety of artificial intelligence algorithms and data related to sound recognition and analysis. Furthermore, the server 200 may include a web server or application server for remotely controlling the sound analysis apparatus 100.

Artificial intelligence refers to a field of studying artificial intelligence or a methodology for creating the same. Moreover, machine learning refers to a field of defining various problems dealing in an artificial intelligence field and studying methodologies for solving the same. In addition, machine learning may be defined as an algorithm for improving performance with respect to a task through repeated experience with respect to the task.

An artificial neural network (ANN) is a model used in machine learning, and may refer in general to a model with problem-solving abilities, composed of artificial neurons (nodes) forming a network by a connection of synapses. The ANN may be defined by a connection pattern between neurons on different layers, a learning process for updating model parameters, and an activation function for generating an output value.

The ANN may include an input layer, an output layer, and may selectively include one or more hidden layers. Each layer includes one or more neurons, and the artificial neural network may include synapses that connect the neurons to one another. In an ANN, each neuron may output a function value of an activation function with respect to the input signals inputted through a synapse, weight, and bias.

A model parameter refers to a parameter determined through learning, and may include weight of synapse connection, bias of a neuron, and the like. Moreover, hyperparameters refer to parameters which are set before learning in a machine learning algorithm, and include a learning rate, a number of iterations, a mini-batch size, an initialization function, and the like.

The objective of training an ANN is to determine a model parameter for significantly reducing a loss function. The loss function may be used as an indicator for determining an optimal model parameter in a learning process of an artificial neural network.

The machine learning may be classified into supervised learning, unsupervised learning, and reinforcement learning depending on the learning method.

Supervised learning may refer to a method for training an artificial neural network with training data that has been given a label. In addition, the label may refer to a target answer (or a result value) to be guessed by the artificial neural network when the training data is inputted to the artificial neural network. Unsupervised learning may refer to a method for training an artificial neural network using training data that has not been given a label. Reinforcement learning may refer to a learning method for training an agent defined within an environment to select an action or an action order for maximizing cumulative rewards in each state.

Machine learning of an artificial neural network implemented as a deep neural network (DNN) including a plurality of hidden layers may be referred to as deep learning, and the deep learning is one machine learning technique. Hereinafter, the meaning of machine learning includes deep learning.

The server 200 may analyze a sound received from the sound analysis apparatus 100, and may transmit a sound analysis result to the sound analysis apparatus 100. The server 200 may receive sound information to be analyzed from the sound analysis apparatus 100, and may determine a repeated sound pattern of a received sound. To this end, the server 200 may use a sound learning model based on machine learning. The server 200 may transmit a determined repeated sound pattern to the sound analysis apparatus 100. The server 200 may provide the determined repeated sound pattern to the sound learning model as input data to train and update the sound learning model.

The server 200 may receive an input sound or target sound of a target space from the sound analysis apparatus 100, and may store and manage a received sound together with target space information in a storage accessible by the server 200. Furthermore, the server 200 may store and manage, in the storage, a repeated sound pattern of the target space determined as a result of sound analysis together with the target space information.

The network 300 may serve to connect the sound analysis apparatus 100 and the server 200. The network 300 may include a wired network such as a local area network (LAN), a wide area network (WAN), a metropolitan area network (MAN), or an integrated service digital network (ISDN), and a wireless network such as a wireless LAN, a CDMA, Bluetooth®, or satellite communication, but the present disclosure is not limited to these examples. The network 300 may also send and receive information using short distance communication and/or long distance communication. Short-range communication may include Bluetooth®, radio frequency identification (RFID), infrared data association (IrDA), ultra-wideband (UWB), ZigBee, and Wi-Fi (wireless fidelity) technologies, and the long distance communication may include code division multiple access (CDMA), frequency division multiple access (FDMA), time division multiple access (TDMA), orthogonal frequency division multiple access (OFDMA), and single carrier frequency division multiple access (SC-FDMA).

The network 300 may include connection of network elements such as a hub, a bridge, a router, a switch, and a gateway. The network 300 can include one or more connected networks, for example, a multi-network environment, including a public network such as an internet and a private network such as a safe corporate private network. Access to the network 300 may be provided via one or more wired or wireless access networks. Further, the network 300 may support 5G communication and/or an Internet of things (IoT) network for exchanging and processing information between distributed components such as objects.

Figure 2:
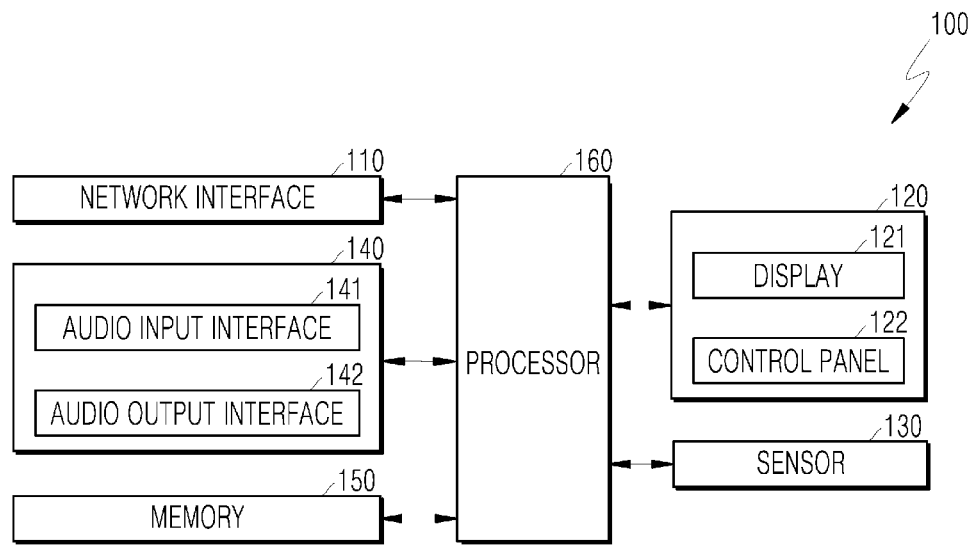
FIG. 2 is a schematic block diagram illustrating a sound analysis apparatus according to an embodiment.

FIG. 2 is a schematic block diagram illustrating a sound analysis apparatus according to an embodiment.

The sound analysis apparatus 100 may comprise a network interface 110, a user interface 120 comprising a display 121 and a control panel 122, a sensor 130, an audio processor 140 comprising an audio input interface 141 and an audio output interface 142, a memory 150, and a processor 160.

The network interface 110 may interwork with the network 300 to provide a communication interface required for providing, in a form of packet data, transmission/reception signals between the sound analysis apparatus 100 and the server 200. Furthermore, the network interface 110 may be a device comprising hardware and software required for transmitting/receiving signals such as a control signal and a data signal via a wired/wireless connection to another network device. Furthermore, the network interface 110 may support a variety of object-to-object intelligent communication (Internet of things (IoT), Internet of everything (IoE), Internet of small things (IoST), etc.), and may support machine to machine (M2M) communication, vehicle to everything (V2X) communication, device to device (D2D) communication, etc.

The network interface 110 may receive data comprising an input sound under control by the processor 160. The processor 160 may extract the input sound from the data comprising the input sound received via the network interface 110 to execute a sound analysis method according to an embodiment.

The network interface 110 may transmit the input sound to the server 200 under control by the processor 160, and may receive, from the server 200, a sound analysis result as a response to the input sound. Here, the sound analysis result may comprise, for example, a repeated matching relationship of the input sound, a repeated sound pattern repeatedly generated in a target space, and a sound learning model.

The display 121 of the user interface 120 may display an operation state of the sound analysis apparatus 100 under control by the processor 160. According to an embodiment, the display 121 may form a layered structure with a touch pad so as to be configured as a touch screen. In this case, the display 121 may also be used as the control panel 122 capable of inputting information in response to a touch of a user. To this end, the display 121 may be configured with a touch-sensitive display controller or other various input and output controllers. As an example, the touch recognition display controller may provide an output interface and an input interface between the device and the user. The touch recognition display controller may transmit and receive electrical signals with the processor 160. Also, the touch recognition display controller may display a visual output to the user, and the visual output may comprise text, graphics, images, video, and a combination thereof. The display 121 may be a predetermined display member such as, for example, a touch-sensitive organic light emitting display (OLED), liquid crystal display (LCD), or light emitting display (LED).

The control panel 122 of the user interface 120 may have a plurality of operation buttons (not shown) to transmit signals corresponding to the buttons to the processor 160.

This control panel 122 may be configured with a sensor, button, or switch structure capable of recognizing a touch or pressing operation of the user. The control panel 122 may transmit, to the processor 160, an operation signal operated by the user to check or change a variety of information related to operation of the sound analysis apparatus 100 and displayed on the display 121.

The display 121 may output a sound analysis result from the sound analysis apparatus 100 under control by the processor 160. Here, the sound analysis result may comprise, for example, a repeated matching relationship of the input sound, a repeated sound pattern repeatedly generated in a target space, and a sound learning model.

The sensor 130 may comprise various sensors for sensing surrounding situations of the sound analysis apparatus 100.

The sensor 130 may comprise a position sensor. The sensor may comprise position data of the sound analysis apparatus 100. For example, the position sensor comprises a global positioning system (GPS) sensor, an inertial measurement unit (IMU) sensor, and the like. The IMU sensor may comprise, for example, an acceleration sensor and/or a gyro sensor. Position data obtained by the position sensor may be stored in the memory 150.

The sensor 130 may comprise a proximity sensor. The proximity sensor may obtain position data of an object (e.g., a user) located near the sound analysis apparatus 100 using infrared light or the like. The position data of the user obtained by the proximity sensor may be stored in the memory 150.

The sensor 130 may comprise an image sensor. The image sensor may comprise a camera (not shown) for capturing an image of a periphery of the sound analysis apparatus 100, and a plurality of the image sensors may be installed for efficiency of image capture. For example, the camera may comprise: an image sensor (e.g., a CMOS image sensor) including at least one optical lens and a plurality of photodiodes (e.g., pixels) for forming an image by light that has passed through the optical lens; and a digital signal processor (DSP) for composing an image on the basis of signals output from the photodiodes. The digital signal processor may generate not only still images but also moving pictures composed of frames of still images. Meanwhile, images captured and obtained by the camera, which is an image sensor, may be stored in the memory 150.

The sensor 130 may comprise a sensor capable of detecting surrounding situations of the sound analysis apparatus 100, for example, at least one among a lidar sensor, a weight detection sensor, an illumination sensor, a touch sensor, an acceleration sensor, a magnetic sensor, a gravity sensor (G-sensor), a gyroscope sensor, a motion sensor, an RGB sensor, an infrared (IR) sensor, a finger scan sensor, an ultrasonic sensor, an optical sensor, a microphone, a battery gauge, an environment sensor (e.g., a barometer, a hygrometer, a thermometer, a radiation detection sensor, a thermal detection sensor, a gas detection sensor, etc.), and a chemical sensor (e.g., an electronic nose, a healthcare sensor, a biometric sensor, etc.). Meanwhile, the sound analysis apparatus 100 may combine and use pieces of information sensed by at least two of the above sensors.

The audio input interface 141 of the audio processor 140 may receive an input sound generated in a target space. To this end, the audio input interface 141 may comprise at least one microphone (not shown). The audio input interface 141 may transfer a sound detected by a microphone to the processor 160.

The audio input interface 141 may be provided with a plurality of microphones (not shown). Here, the plurality of microphones may be spaced apart from each other so as to be arranged at different target spaces, and may process a received sound into an electric signal. The audio input interface 141 may obtain an input sound from the plurality of microphones arranged at different target spaces. A plurality of input sounds collected in each target space by using the plurality of microphones are stored in the memory 150 together with information about the target spaces from which each input sound has been received.

In an example, the sound analysis apparatus 100 may obtain an input sound by visiting each target space without arranging a microphone in each target space. For example, the sound analysis apparatus 100 may obtain an input sound while periodically staying in each target space for a prescribed period of time. In this case, the sound analysis apparatus 100 may be a mobile electronic device such as a mobile home robot.

Optionally, the audio input interface 141 may use various noise reduction algorithms for reducing a noise generated while receiving an input sound. In an optional embodiment, the audio input interface 141 may comprise various elements for processing a voice signal, such as a filter (not shown) for reducing a noise when receiving an input sound and an amplifier (not shown) for amplifying and outputting a signal output from the filter.

Under control by the processor 160, the audio output interface 142 of the audio processor 140 may output, in an audio form, a warning sound, an operation mode, an operation state, a notification message pertaining to an error state or the like, a result of analyzing an input sound, response information corresponding to a speech of the user, a processing result corresponding to a voice input from the user, etc. The audio output interface 142 may convert an electric signal received from the processor 160 into an audio signal, and may output the audio signal. To this end, the audio output interface 142 comprises a speaker. The audio output interface 142 may output an analysis result from the sound analysis apparatus 100 through the speaker under control by the processor 160. Here, the analysis result may comprise, for example, a repeated matching relationship of an input sound and a repeated sound pattern generated repeatedly in a target space.

The memory 150, which stores a variety of information required for operating the sound analysis apparatus 100, may include a volatile or non-volatile recording medium. For example, the memory 150 may store a voice command including a start word that activates the sound analysis apparatus 100.

The memory 150 may store an input sound received through the audio input interface 141 under control by the processor 160. Furthermore, the memory 150 may store information detected by the sensor 130. The memory 150 may store a variety of information analyzed by the sound analysis apparatus 100 under control by the processor 160. The information analyzed by the sound analysis apparatus 100 may comprise, for example, a repeated matching relationship of an input sound, repeated sound pattern information in a target space, and a sound learning model.

The memory 150 may store the sound learning model under control by the processor 160.

The memory 150 may include, but is not limited to, magnetic storage media or flash storage media. This memory 150 may include an internal memory and/or an external memory and may include a volatile memory such as a DRAM, a SRAM or a SDRAM, and a non-volatile memory such as one time programmable ROM (OTPROM), a PROM, an EPROM, an EEPROM, a mask ROM, a flash ROM, a NAND flash memory or a NOR flash memory, a flash drive such as an SSD, a compact flash (CF) card, an SD card, a Micro-SD card, a Mini-SD card, an XD card or memory stick, or a storage device such as a HDD.

The processor 160 may analyze an input sound received through the audio input interface 141, and may provide a result of analysis as visual information through the display 121 or as auditory information through the audio output interface 142.

The processor 160, which is a type of a central processor, may control overall operation of the sound analysis apparatus 100 by operating control software installed in the memory 150. The processor 160 may include any type of devices capable of processing data. Here, the processor 160 may, for example, refer to a data processing device embedded in hardware, which has physically structured circuitry to perform a function represented by codes or instructions contained in a program. As one example of the data processing device embedded in the hardware, a microprocessor, a central processor (CPU), a processor core, a multiprocessor, an application-specific integrated circuit (ASIC), a field programmable gate array (FPGA), and the like may be included, but the scope of the present disclosure is not limited thereto.

The processor 160 may control each component module of the sound analysis apparatus 100 to execute an application program for implementing a sound analysis method according to an embodiment.

The processor 160 may control the microphone of the audio input interface 141 to obtain an input sound of a target space, or may control the network interface 110 to receive a remotely obtained input sound.

The processor 160 may operate to determine a repeated sound pattern in a target sound obtained from a target space on the basis of a sound learning model. The processor 160 may use the sound learning model stored in the memory 150 to operate to determine the repeated sound pattern in the target sound. The processor 160 may transmit the target sound to the server 200 via the network interface 110, and may receive, via the network interface 110, the repeated sound pattern of the target sound determined by the server 200 using the sound learning model stored in the server 200.

The processor 160 may obtain an input sound generated in a target space, and may divide the input sound according to a predetermined time interval to generate one set of sub sounds. The processor 160 may be configured to determine at least one repeated matching relationship for each sub sound on the basis of similarity between the sub sounds of the input sound. In other words, the processor 160 may be configured to determine at least one repeated matching relationship between repeated sub sounds of the one set of sub sounds based on similarity. Further, the processor 160 may be configured to extract a repeated sound pattern generated in a target space based on the determined repeated matching relationship.

The processor 160 may be configured to train the sound learning model stored in the memory 150 using the repeated sound pattern extracted from the input sound. In an example, the processor 160 may transmit the repeated sound pattern extracted from the input sound to the server 200 via the network interface 110.

The processor 160 may receive the sound learning model trained in the server 200 via the network interface 110, and may store the sound learning model in the memory 150.

The processor 160 may obtain a target sound from a target space, and may divide the target sound according to a predetermined time interval to generate one set of target sub sounds. The processor 160 may be configured to determine whether each target sub sound is a repeated sound pattern of the target space using the sound learning model stored in the memory 150.

The processor 160 may be configured to determine, as a noise of the target space, the target sub sound determined as the repeated sound pattern of the target space. The processor 160 may use, in a voice recognition operation, the target sub sound determined as a noise of the target space. Accordingly, it is possible to provide a voice recognition service considering a sound environment of a target space, and accuracy of voice recognition may be improved.

The processor 160 may perform machine learning such as deep learning or the like on an obtained sound so that the sound analysis apparatus 100 may output an optimal analysis result, and the memory 150 may store data used in the machine learning, result data, etc. For example, the memory 150 may store the sound learning model for distinguishing a repeated sound pattern in an obtained sound.

The processor 160 may operate an artificial neural network, and may perform machine learning-based sound analysis using sound data as input data. For example, the processor 160 may determine a repeated matching relationship in a sound and may distinguish a repeated sound pattern by analyzing the sound generated in a target space using a machine learning-based sound learning model.

Figure 3:
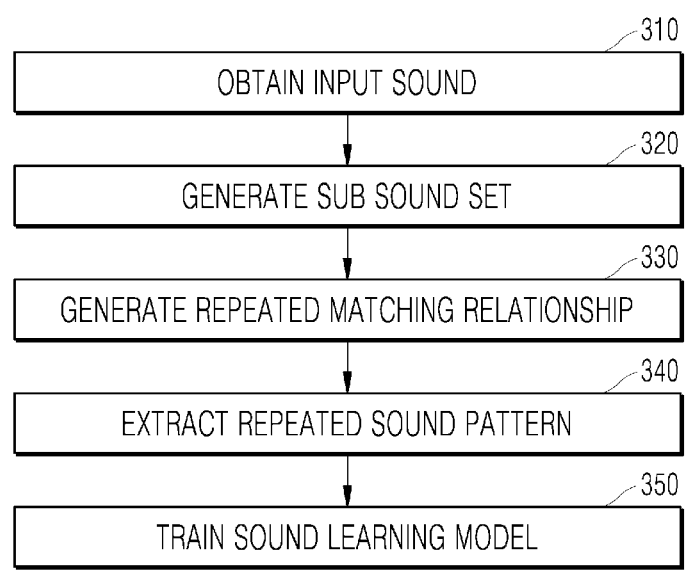
FIG. 3 is a flowchart illustrating a sound analysis method according to an embodiment.

FIG. 3 is a flowchart illustrating a sound analysis method according to an embodiment.

The sound analysis apparatus 100 may collect, analyze and learn a sound generated in a target space according to the sound analysis method according to an embodiment.

The sound analysis method may comprise a step 310 of obtaining an input sound generated in a target space, a step 320 of generating a first set of sub sounds by dividing the input sound according to a first predetermined time interval, a step 330 of determining at least one repeated matching relationship between repeated sub sounds of the first set of sub sounds based on similarity, a step 340 of extracting a repeated sound pattern generated in the target space based on the determined at least one repeated matching relationship, and a step 350 of training a sound learning model for the target space using the repeated sound pattern.

In the step 310, the sound analysis apparatus 100 may obtain the input sound generated in the target space. The sound analysis apparatus 100 may directly obtain the input sound via the audio input interface 140 and/or may receive data comprising the input sound via the network interface 110.

In the step 310, the sound analysis apparatus 100 may detect the input sound using a microphone arranged in the target space.

The target space represents a place in which a sound to be analyzed is collected. In an example, the target space, which is a separate space having a certain area, may have a unique sound environment. For example, each of multiple offices located on one floor of a building may constitute one target space. For example, in the case of a home, each of a main room, a living room, a kitchen, a bedroom, a veranda, and a study room may be a separate target space. In an example, the target space may represent one spatial location. For example, in the case of a bedroom, a window-side space and a door-side space may be different target spaces.

The sound analysis apparatus 100 may use location information and/or image information of the target space detected through the sensor 130 as identification information about the target space under control by the processor 160. The sound analysis apparatus 100 may obtain the target space identification information from a user's speech detected by the microphone of the audio input interface 141 or may obtain the target space via the network interface 110 under control by the processor 160.

The sound analysis apparatus 100 may detect the input sound from a plurality of microphones arranged in each target space. The sound analysis apparatus 100 may use the microphones arranged in each of the plurality of target spaces to analyze, for each space, input sounds generated in the plurality of target spaces. In an example, the sound analysis apparatus 100 may visit the plurality of target spaces to detect the input sound. In an example, the sound analysis apparatus 100 may be arranged in each target space.

In the step 310, the sound analysis apparatus 100 may obtain the input sound from the target space at predetermined intervals. For example, the predetermined interval may be, but is not limited to, 12 hours or 24 hours, and may be adjusted as necessary by the user. The sound analysis apparatus 100 may periodically obtain the input sound in the target space at the predetermined interval. For example, the sound analysis apparatus 100 may collect, for 12 hours or 24 hours, a sound generated in the target space through the microphone arranged in the target space.

In the step 320, the sound analysis apparatus 100 may generate a first set of sub sounds by dividing the input sound obtained in the step 310 according to a first predetermined time interval.

Dividing the input sound indicates that the input sound is divided into a plurality of sections according to the first predetermined time interval. The sub sound of the input sound is a part of the input sound, and has a playback time equal to or shorter than a time interval used to divide the input sound.

The sound analysis apparatus 100 may store, in the memory 150, a pair of start position information and end position information of a sub sound in an input sound file under control by the processor 160. In this case, the sound analysis apparatus 100 may store and manage, in the memory 150, the pair of start position information and end position information of each sub sound of one set of sub sounds as a table under control by the processor 160. The sound analysis apparatus 100 may use this table to access the pair of start position information and end position information about each sound under control by the processor 160. Here, the table is a data structure in which data mapped to an index may be accessed using a predefined index, and may be implemented as, but is not limited to, an array, a linked list, a hash table, or the like.

The sound analysis apparatus 100 may store, in the memory 150, each sub sound as one audio file under control by the processor 160. Here, various audio file formats such as mp3, way, wma, avi, and aac may be used.

In the step 320, the sound analysis apparatus 100 may repeatedly divide each sub sound of the first set of sub sounds generated by dividing the input sound according to a second predetermined time interval so as to generate a second set of sub sounds. Furthermore, in the step 320, the sound analysis apparatus 100 may generate the second set of sub sounds by dividing, according to a second predetermined time interval, the input sound from a start point which is different from that of the division for generating the first set of sub sounds.

That is, in the step 320, the sound analysis apparatus 100 may generate a plurality of sub sound sets by repeatedly dividing the input sound using a plurality of dividing schemes.

The plurality of dividing schemes includes dividing schemes in which a division time interval is varied or a division start point is varied. Hereinafter, exemplary sound dividing schemes will be described with reference to FIGS. 4 and 5.

Figure 4:
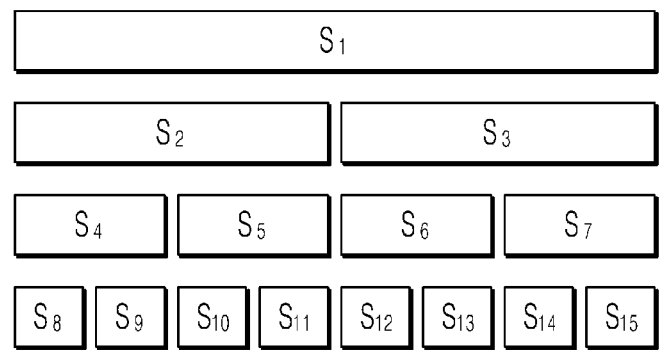
FIG. 4 is a diagram exemplarily illustrating sound dividing schemes according to an embodiment.
Figure 5:
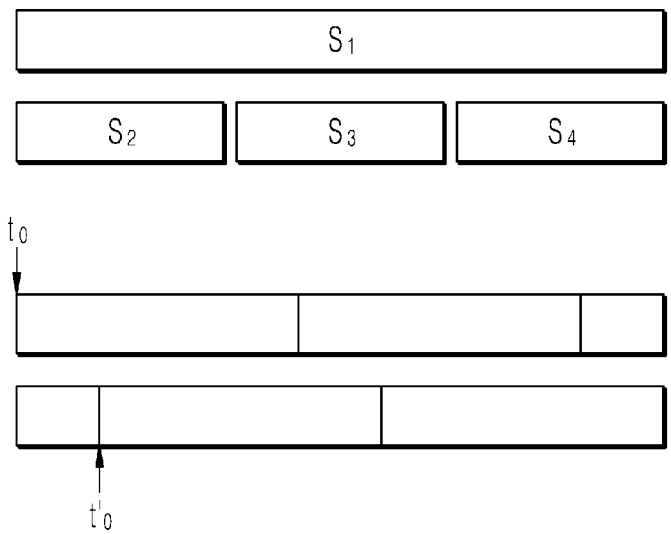
FIG. 5 shows diagrams exemplarily illustrating sound dividing schemes according to an embodiment.

FIGS. 4 and 5 are diagrams exemplarily illustrating sound dividing schemes according to an embodiment.

The sound analysis apparatus 100 may repeatedly divide the input sound into N equal parts (where N is a natural number larger than 1) until a time length of a sub sound is equal to or smaller than a threshold length. The threshold length is set in units of time, such as one hour, and may be adjusted as necessary by the user.

FIG. 4 exemplarily illustrates a dividing scheme in which an input sound $S_1$ is repeatedly divided into two equal parts to generate a plurality of sub sound sets.

A first set of sub sounds comprises sub sound $S_2$ and sub sound $S_3$ generated by dividing the input sound $S_1$ into equal two parts.

A second set of sub sounds comprises a sub sound $S_4$, a sub sound $S_5$, a sub sound $S_6$, and a sub sound $S_7$ generated by dividing each of the sub sound $S_2$ and the sub sound $S_3$ into equal two parts.

A third set of sub sounds comprises sub sounds $S_8$, $S_9$, $S_{10}$, $S_{11}$, $S_{12}$, $S_{13}$, $S_{14}$, and $S_{15}$ generated by dividing each of the sub sounds $S_4$, $S_5$, $S_6$, and $S_7$ comprised in the second set of sub sounds.

When the time length of each sub sound of the third set of sub sounds is longer than a preset threshold length, the sound analysis apparatus 100 may generate an additional set of sub sounds by repeating division.

FIG. 5 exemplarily illustrates a dividing scheme in which an input sound $S_1$ is repeatedly divided into three equal parts to generate a set of sub sounds $S_2$, $S_3$, and $S_4$.

FIG. 5 exemplarily illustrates another dividing scheme in which a division start point of an input sound is varied to generate a set of sub sounds.

The sound analysis apparatus 100 generates a first set of sub sounds by dividing the input sound from a first start point $t_0$ of the input sound according to a first predetermined time interval. The sound analysis apparatus 100 generates a second set of sub sounds by dividing the input sound from a second start point $t'_0$ of the input sound according to a second predetermined time interval. In an example, the second start point $t'_0$ may have a value smaller than a preset threshold length. In an example, the second start point $t'_0$ may be set to a length of a last sub sound of the first set of sub sounds generated by dividing the input sound from the first start point $t_0$.

The sound analysis apparatus 100 may use a plurality of dividing schemes in combination. For example, a first set of sub sounds may be generated by dividing the input sound into two equal parts, a second set of sub sounds may be generated by dividing each sub sound of the first set of sub sounds into three equal parts, a third set of sub sounds may be generated by dividing, according to a predetermined time interval, each sub sound of the second set of sub sounds by varying a start point $t_2$, and a fourth set of sub sounds may be generated by dividing, according to a predetermined time interval, each sub sound of the second set of subs sounds from a new start point $t_3$.

In the step 330, the sound analysis apparatus 100 may determine the repeated matching relationship for each sub sound on the basis of sub sound similarity of the one set of sub sounds generate in the step 320.

The sound analysis apparatus 100 may determine the repeated matching relationship for each sub sound of the one set of sub sounds.

To this end, the step 330 may comprise a step of selecting, as a target sub sound, one sub sound of the one set of sub sounds generated in the step 320. In an example, the sound analysis apparatus 100 may sequentially select, as the target sub sound, each sub sound of the one set of sub sounds. In an example, the sound analysis apparatus 100 may select, as the target sub sound, a sub sound of a time point at which possibility of occurrence of the repeated matching relationship is highest from among the sub sounds of the one set of sub sounds on the basis of log information accumulated by analyzing the input sound collected in a target space.

The repeated matching relationship represents structured repetition positions of the target sub sound when the target sub sound repeatedly appears after determining whether each sub sound (i.e., the target sub sound) of the first set of sub sounds repeatedly appears within the first set of sub sounds. The repeated matching relationship may be defined between sub sounds having the same time length.

The repetition positions may comprise information about a start position at which the target sub sound starts to appear repeatedly and/or end position information. The repetition positions may comprise information about a time slot occupied by a repeated sub sound. In an example, the repeated matching relationship of the target sub sound may be expressed as various data structures. For example, the repeated matching relationship may be expressed as a linked list.

For example, when a sub sound which is present in a first time slot (0 hour-1 hour) is selected as the target sub sound from the first set of sub sounds divided in units of one hour, if the target sub sound is repeated in a second time slot (3 hour-4 hour) and a third time slot (12 hour-13 hour), the repetition positions may be determined as the first time slot, the second time slot, and the third time slot. The sound analysis apparatus 100 may structure such repetition positions as the repeated matching relationship to store the repeated matching relationship in the memory 150 as a linked list under control by the processor 160. Here, the linked list may be a sequential connection of the first time slot-second time slot-third time slot.

The sub sound similarity represents a degree of matching between sub sounds. In the step 330, the sound analysis apparatus 100 may compare waveforms of two sub sounds to determine the similarity between the two sub sounds according to the degree of matching between the waveforms.

The sound analysis apparatus 100 may determine the similarity between the target sub sound selected from the first set of sub sounds and the other sub sounds of the first set of sub sounds to determine the repeated matching relationship. To this end, the step 330 may comprise a step of adding, to the repeated matching relationship for the target sub sound, a sub sound having the same waveform as the target sub sound among the other sub sounds of the first set of sub sounds.

In addition, the sound analysis apparatus 100 may determine the similarity between the target sub sound selected from the first set of sub sounds and a sub sound of a second set of sub sounds to determine the repeated matching relationship of the target sub sound. To this end, the step 330 may comprise a step of identifying a sub sound having the same waveform as the target sub sound among the second set of sub sounds.

In an example, the second set of sub sounds is generated by dividing the same input sound as the input sound divided into the first set of sub sounds in the step 320. In an example, the second set of sub sounds is generated by dividing second input sound obtained previously in a target place from which the input sound divided into the first set of sub sounds in the step 320 was obtained. Hereinafter, examples will be described with reference to FIG. 6.

Figure 6:
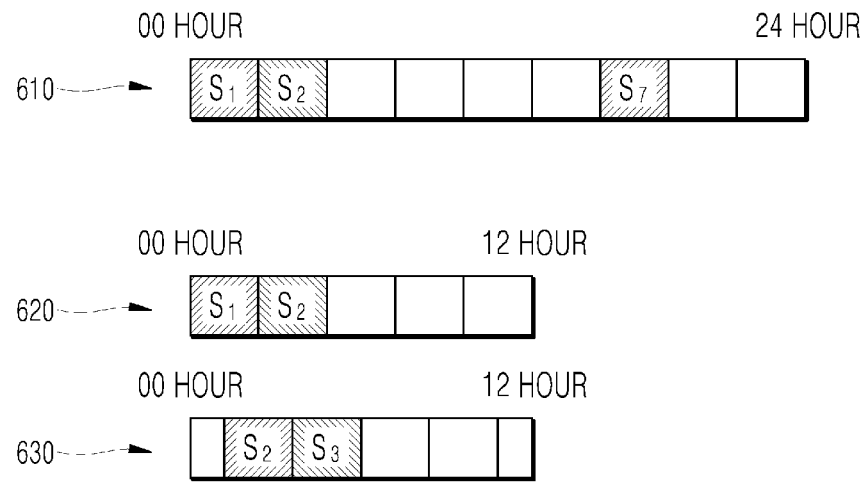
FIG. 6 shows diagrams illustrating repeated matching relationships according to an embodiment.

FIG. 6 shows diagrams illustrating repeated matching relationships according to an embodiment.

Diagram 610 illustrates the repeated matching relationship in one set of sub sounds obtained by dividing an input sound. When the target sub sound is a sub sound $S_1$, the sub sound $S_1$ matches a sub sound $S_7$ but does not match a sub sound $S_2$, and thus the sound analysis apparatus 100 determines $S_1$-$S_7$ as the repeated matching relationship of $S_1$. When the target sub sound is the sub sound $S_2$, the sub sound $S_2$ has no matched sub sound, and thus does not have the repeated matching relationship.

Diagram 620 and Diagram 630 illustrate the repeated matching relationship in a first set of sub sounds and a second set of sub sounds generated by varying a division start point of the same input sound. In Diagram 620, when a sub sound $S_1$ of the first set of sub sounds is the target sub sound, the sub sound $S_1$ matches a sub sound $S_2$ of the second set of sub sounds, and thus the sound analysis apparatus 100 adds the sub sound $S_2$ of the second set of sub sounds to the repeated matching relationship of the target sub sound $S_1$. In Diagram 630, when a sub sound $S_2$ of the first set of sub sounds is the target sub sound, the sub sound $S_2$ matches a sub sound $S_3$ of the second set of sub sounds, and thus the sound analysis apparatus 100 adds the sub sound $S_3$ of the second set of sub sounds to the repeated matching relationship of the target sub sound $S_2$.

Diagram 640 and Diagram 650 illustrate the repeated matching relationship in a first set of sub sounds and a second set of sub sounds generated by varying a time interval of the same input sound as illustrated in Diagram 620 and Diagram 630. When a sub sound $S_1$ of the first set of sub sounds is the target sub sound, the sub sound $S_1$ matches a sub sound $S_2$ of the second set of sub sounds, and thus the sound analysis apparatus 100 adds the sub sound $S_2$ of the second set of sub sounds to the repeated matching relationship of the target sub sound $S_1$. With regard to Diagram 640 and Diagram 650, since the length of a sub sound is longer than that illustrated in Diagram 620 and Diagram 630, the repeated matching relationship may be derived for a longer time slot.

Referring to FIG. 3, in the step 340, the sound analysis apparatus 100 may extract a repeated sound pattern which repeatedly occurs in a target space based on the repeated matching relationship determined in the step 330.

The sound analysis apparatus 100 determines a target sub sound as the repeated sound pattern based on a repetition period of the repeated matching relationship of the target sub sound.

The repetition period of a sub sound may be determined on the basis of the repetition positions of the repeated matching relationship. For example, when a first sub sound and a second sub sound are included in the repeated matching relationship, the repetition period may be determined as a distance (difference between time slots, i.e., 3 hours) between a time slot (e.g., 2 hour-3 hour) of the first sub sound and a time slot (e.g., 5 hour-6 hour) of the second sub sound.

When the target sub sound has the repeated matching relationship within a sub sound set to which the target sub sound belongs, the sound analysis apparatus 100 may perform the following steps during the step 340. That is, the sound analysis apparatus 100 performs the following steps under control by the processor 160. That is, the sound analysis apparatus 100 performs:

(step 1-1) a step of selecting a target sub sound included in a repeated matching relationship from a first set of sub sounds;

(step 1-2) a step of determining a first repetition period of the target sub sound in the first set of sub sounds;

(step 1-3) a step of determining a second repetition period of the target sub sound in a second set of sub sounds based on another repeated matching relationship of the second set of sub sounds obtained previously from a target space. Here, the second repetition period is based on another repeated matching relationship between repeated sub sounds of the second set of sub sounds; and (step 1-4) a step of extracting the a repeated sound pattern including the target sub sound when a difference between the first repetition period and the second repetition period is equal to or less than a threshold value. Here, the threshold value may be set to a value equal to or smaller than a time interval of the target sub sound. For example, when the target sub sound has a 1-hour section, the threshold value may be set to a value equal to or smaller than a 1 hour. For example, the threshold value may be set to 0. In an example, the threshold value may be differently set and adjusted according to the type, level, and repetitiveness of a sound generated in a sound environment.

When the target sub sound does not have the repeated matching relationship within a sub sound set to which the target sub sound belongs, the sound analysis apparatus 100 may perform the following steps during the step 340. That is, the sound analysis apparatus 100 performs the following steps under control by the processor 160. That is, the sound analysis apparatus 100 performs:

(step 2-1) a step of selecting a target sub sound which is not included in a repeated matching relationship from a first set of sub sounds;

(step 2-2) a step of searching for a sub sound that matches the target sub sound from a second set of sub sounds obtained previously from a target space; and (step 2-3) a step of extracting the repeated sound pattern including the target sub sound when a difference between corresponding time slots of the target sub sound and a matched sub sound is equal to or less than a threshold value.

Here, the threshold value may be set to a value equal to or smaller than a time interval of the target sub sound. For example, when the target sub sound has a 1-hour section, the threshold value may be set to a value equal to or smaller than a 1 hour. For example, the threshold value may be set to 0. In an example, the threshold value may be differently set and adjusted according to the type, level, and repetitiveness of a sound generated in a sound environment.

Hereinafter, extraction of a repeated sound pattern will be exemplarily described with reference to FIG. 7.

Figure 7:
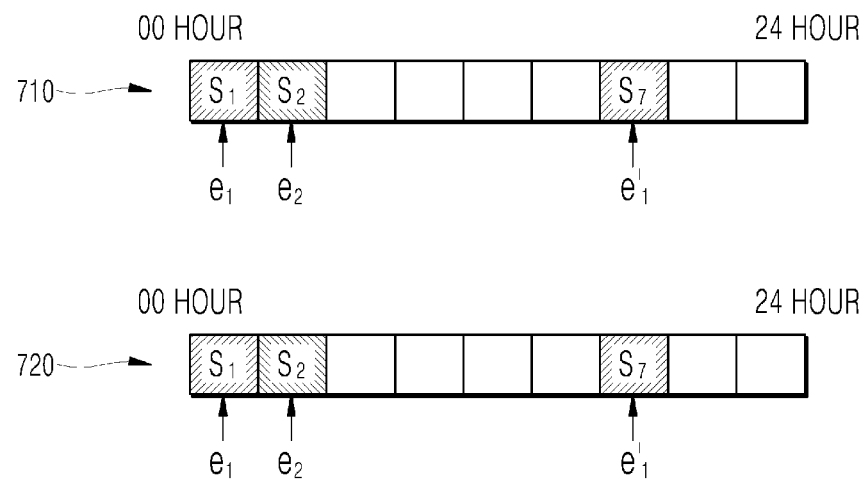
FIG. 7 shows diagrams illustrating repeated sound patterns according to an embodiment.

FIG. 7 shows diagrams illustrating repeated sound patterns according to an embodiment.

Diagram 710 illustrates a first input sound obtained in a target place during 24 hours on a first day, and Diagram 720 illustrates a second input sound obtained in the same target place during 24 hours on a second day different from the first day.

It is assumed that a sub sound $S_1$ of the first input sound have the repeated matching relationship with a sub sound $S_7$ of the same day and a sub sound $S_1$ and sub sound $S_7$ of the second input sound. Furthermore, it is assumed that a sub sound $S_2$ of the first input sound has no repeated matching relationship within the first input sound, and has the repeated matching relationship with a sub sound $S_2$ of the second input sound.

When the sub sound $S_1$ of the first input sound of Diagram 710 is the target sub sound, the target sub sound has the repeated matching relationship within the corresponding set of sub sounds, and thus it may be determined whether to extract the sound pattern $S_1$ as the repeated sound pattern by performing the above-mentioned steps 1-1 to 1-4.

In detail, the sound analysis apparatus 100 selects the target sub sound $S_1$ in the step 1-1, and determines a first repetition period of the target sub sound $S_1$ in the first input sound in the step 1-2. For example, if the sub sound $S_1$ corresponds to a time slot of from 0 hour to 1 hour in the first input sound, and the sub sound $S_7$ corresponds to a time slot of from 6 hour to 7 hour, the first repetition period is 5 hours. Likewise, the sound analysis apparatus 100 may determine a second repetition period of the target sub sound $S_1$ of the second input sound as 5 hours in the step 1-3. The sound analysis apparatus 100 may determine the target sub sound $S_1$ as the repeated sound pattern of the first input sound since a difference between the first repetition period and the second repetition period is 0 in the step 1-4. That is, a sub sound may be determined as the repeated sound pattern of a target space, wherein the repetition period of the sub sound on the first day and the repetition period of the sub sound on the second day are the same or the difference therebetween is equal to or smaller than a threshold value.

The sound analysis apparatus 100 may determine the repeated sound pattern using mathematical expression 1 below according to whether a difference between repetition periods 'd' of occurrence of a sound event 'e' generated in a sub sound is equal to or smaller than a threshold value α without using a time slot of the sub sound.

$$|d_2(e_1,e'_1)-d_1(e_1,e'_1)|<\alpha \qquad \text{(Mathematical Expression 1)}$$

For example, the steps 1-2 to 1-4 may be performed using, as the repetition period 'd', the difference between a point of time of occurrence of a sound event $e_1$ of the target sub sound $S_1$ and a point of time of occurrence of a sound event $e'_1$ of the sub sound $S_7$ having the repeated matching relationship with the target sub sound.

When the sub sound $S_2$ of the first input sound of Diagram 710 is the target sub sound, the target sub sound has no repeated matching relationship within the corresponding set of sub sounds, and thus it may be determined whether to extract the sound pattern $S_2$ as the repeated sound pattern by performing the above-mentioned steps 2-1 to 2-3.

In detail, the sound analysis apparatus 100 selects the target sub sound $S_2$ in the step 2-1, and searches for the sub sound $S_2$ of the second input sound which matches the target sub sound $S_2$ in the step 2-2. The sound analysis apparatus 100 calculates a difference between a time slot of the target sub sound $S_2$ and a time slot of the matched sub sound $S_2$ of the second input sound in the step 2-3. For example, if the target sub sound $S_2$ corresponds to a time slot of from 3 hour to 4 hour in the first input sound, and the sub sound $S_2$ corresponds to a time slot of from 3 hour to 4 hour in the second input sound, the time slot difference is 0. The sound analysis apparatus 100 may determine the target sub sound $S_2$ as the repeated sound pattern of the first input sound since the time slot difference is 0 in the step 2-3. That is, a sub sound which is repeated in the same time slot on the first day and second day may be extracted as the repeated sound pattern of a target place.

The sound analysis apparatus 100 may determine the repeated sound pattern using the mathematical expressions below according to whether a difference between points 'p' of time of occurrence of a sound event 'e' generated in a sub sound is equal to or smaller than a threshold value β without using a time slot of the sub sound. In Mathematical expressions 2-1 and 2-2, 's' corresponds to a start point of the input sound.

$$p_2(e_2) = |s - e_2| \quad \text{(Mathematical Expression 2-1)}$$

$$p_1(e_2) = |s - e_2| \quad \text{(Mathematical Expression 2-2)}$$

$$|p_2(e_2) - p_1(e_2)| < \beta \quad \text{(Mathematical Expression 2-3)}$$

For example, the target sub sound $S_2$ may be extracted as the repeated sound pattern of a target place according to whether the difference between a point $p_1$ of time of occurrence of a sound event $e_2$ of the target sub sound $S_2$ and a point $p_2$ of time of occurrence of a sound event $e_2$ of the sub sound $S_2$ of the second input sound which has the repeated matching relationship with the target sub sound is equal to or smaller than the threshold value β.

In the step 350, the sound analysis apparatus 100 may train a sound learning model for the target space on the basis of the repeated sound pattern generated in the step 340.

In the step 350, the sound analysis apparatus 100 may provide, to the sound learning model, the repeated sound pattern extracted from the target space in the step 340 as training data.

The sound analysis apparatus 100 may train the sound learning model based on a deep auto-encoder in order to extract a feature from the repeated sound pattern.

An auto-encoder (AE) is a neural network which aims to reconstruct its input as output. More specifically, AE may comprise an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

In an example, the sound analysis apparatus 100 may provide, to the sound learning model, a sub sound set divided according to time intervals of the same length for each target place as input data. In an example, the sound analysis apparatus 100 may generate the sound learning model for each target place.

The sound analysis method according to an embodiment may further comprise a step of identifying the repeated sound pattern of a target sound obtained in a target space using the sound learning model trained in the step 350. This step will be described with reference to FIG. 8.

Figure 8:
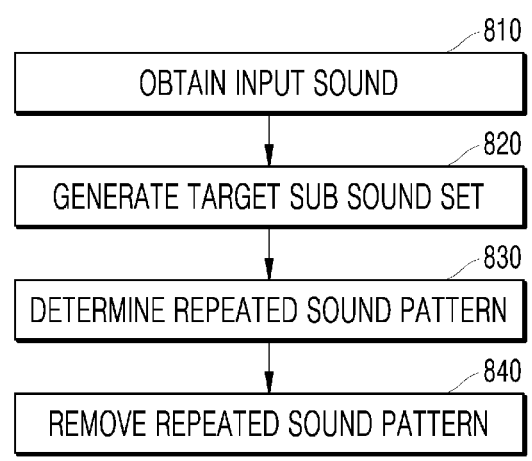
FIG. 8 is a flowchart illustrating a sound analysis process according to an embodiment.

FIG. 8 is a flowchart illustrating a sound analysis process according to an embodiment.

The sound analysis method according to an embodiment may further comprise a step of identifying the repeated sound pattern of an input sound obtained in a target space using the sound learning model trained as described with reference to FIG. 3.

The sound analysis apparatus 100 may identify the repeated sound pattern of the input sound obtained in the target space using the sound learning model trained by the sound analysis method described above with reference to FIG. 3.

Identifying the repeated sound pattern may comprise a step 810 of obtaining the input sound generated in the target space, a step 820 of generating a third set of sub sounds by dividing the input sound according to a third predetermined time interval, and a step 830 of identifying the repeated sound pattern from the third set of sub sounds using the sound learning model.

In the step 810, the sound analysis apparatus 100 may obtain the input sound from the target space. The input sound acquisition process of the step 310 described above with reference to FIG. 3 may be directly applied for obtaining the step 810.

In the step 820, the sound analysis apparatus 100 may generate a third set of target sub sounds by dividing the target sound obtained in the step 810 according to a predetermined time interval. The process of the step 320 described above with reference to FIG. 3 may be directly applied to the step 820.

In the step 830, the sound analysis apparatus 100 may determine the repeated sound pattern from the third set of sub sounds generated in the step 820 on the basis of the sound learning model.

In the step 830, the sound analysis apparatus 100 may select an appropriate feature extraction model according to lengths of the input sound and the third set of sub sounds. In the step 830, the sound analysis apparatus 100 may extract a feature of each sub sound of the third set of sub sounds through a weight of the sound learning model based on an auto-encoder, and thus may determine whether each sub sound is a repeated sound pattern.

In addition, determining the repeated sound pattern may further comprise a step 840 of removing the repeated sound pattern from the input sound.

In the step 840, the sound analysis apparatus 100 may classify the repeated sound pattern, as a noise of the target space. During a preprocessing process for removing a noise from the input sound, the sound analysis apparatus 100 may remove, from the input sound, the repeated sound pattern of the target space. Accordingly, it is possible to provide a noise specialized for a sound environment of a target space, and thus the performance of voice recognition is improved.

According to the present disclosure, a sound generated in each target space is collected and analyzed, and thus sound analysis specialized for a sound environment of a target space is possible.

Furthermore, a sound generated in a target space may be effectively learned using a sound learning model specialized for a sound environment of a target space.

Furthermore, since a sound pattern generated repeatedly in a target space is extracted and a sound learning model is trained using the sound pattern, a noise may be effectively removed from an input sound collected in the target space.

The example embodiments described above may be implemented through computer programs executable through various components on a computer, and such computer programs may be recorded on computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

Meanwhile, the computer programs may be those specially designed and constructed for the purposes of the present disclosure or they may be of the kind well known and available to those skilled in the computer software arts. Examples of program code include both machine codes, such as produced by a compiler, and higher level code that may be executed by the computer using an interpreter.

As used in the present disclosure (especially in the appended claims), the singular forms "a," "an," and "the" include both singular and plural references, unless the context clearly states otherwise. Also, it should be understood that any numerical range recited herein is intended to include all sub-ranges subsumed therein (unless expressly indicated otherwise) and accordingly, the disclosed numeral ranges include every individual value between the minimum and maximum values of the numeral ranges.

Operations constituting the method of the present disclosure may be performed in appropriate order unless explicitly described in terms of order or described to the contrary. The present disclosure is not necessarily limited to the order of operations given in the description. All examples described herein or the terms indicative thereof ("for example," etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various modifications, combinations, and alternations can be made depending on design conditions and factors within the scope of the appended claims or equivalents thereof.

It should be apparent to those skilled in the art that various substitutions, changes and modifications which are not exemplified herein but are still within the spirit and scope of the present disclosure may be made.

In the foregoing, while specific embodiments of the present disclosure have been described for illustrative purposes, the scope or spirit of the present disclosure is not limited thereto, it will be understood by those skilled in the art that various changes and modifications can be made to other specific embodiments without departing from the spirit and scope of the present disclosure. Therefore, the scope of the present disclosure should be defined not by the above-described embodiments but by the technical idea defined in the following claims.

What is claimed is:

1. A sound analysis method comprising:
    obtaining an input sound generated in a target space;
    generating a first set of sub sounds by dividing the input sound according to a first predetermined time interval;
    determining at least one repeated matching relationship between repeated sub sounds of the first set of sub sounds based on similarity;
    extracting a repeated sound pattern generated in the target space based on the determined at least one repeated matching relationship; and
    training a sound learning model for the target space using the repeated sound pattern.

2. The sound analysis method of claim 1, wherein the input sound is obtained from the target space at predetermined intervals.

3. The sound analysis method of claim 1, further comprising generating a second set of sub sounds by dividing each sub sound of the first set of sub sounds according to a second predetermined time interval.

4. The sound analysis method of claim 1, wherein the first set of sub sounds is varied by changing a start point for dividing the input sound.

5. The sound analysis method of claim 1, wherein the determining the at least one repeated matching relationship comprises:
    selecting, as a target sub sound, one sub sound of the first set of sub sounds; and
    identifying a sub sound having a same waveform as a waveform of the target sub sound among the first set of sub sounds.

6. The sound analysis method of claim 1, wherein the determining the at least one repeated matching relationship comprises:
    selecting, as a target sub sound, one sub sound of the first set of sub sounds; and
    identifying a sub sound having a same waveform as a waveform of the target sub sound among a second set of sub sounds,
    wherein the second set of sub sounds is generated by dividing another input sound obtained from the target space.

7. The sound analysis method of claim 1, wherein the extracting the repeated sound pattern comprises:
    selecting a target sub sound included in the at least one repeated matching relationship from the first set of sub sounds;
    determining a first repetition period of the target sub sound in the first set of sub sounds;
    determining a second repetition period of the target sub sound in a second set of sub sounds obtained previously from the target space, wherein the second repetition period is based on another repeated matching relationship between repeated sub sounds of the second set of sub sounds; and
    extracting the repeated sound pattern including the target sub sound when a difference between the first repetition period and the second repetition period is less than or equal to a threshold value.

8. The sound analysis method of claim 1, wherein the extracting the repeated sound pattern comprises:
    selecting a target sub sound which is not included in a repeated matching relationship from the first set of sub sounds;
    searching for a sub sound matching the target sub sound from a second set of sub sounds obtained previously from the target space; and
    extracting the repeated sound pattern including the target sub sound when a difference between corresponding time slots of the target sub sound and the matched sub sound is less than or equal to a threshold value.

9. The sound analysis method of claim 1, wherein the training the sound learning model comprises providing the repeated sound pattern to the sound learning model as training data.

10. The sound analysis method of claim 1, further comprising identifying the repeated sound pattern from the target space using the sound learning model.

11. The sound analysis method of claim 10, wherein the identifying the repeated sound pattern comprises:
    obtaining another input sound generated in the target space;
    generating a third set of sub sounds by dividing the another input sound according to a third predetermined time interval; and identifying the repeated sound pattern from the third set of sub sounds using the sound learning model.

12. A sound analysis apparatus comprising:
a microphone configured to obtain an input sound generated in a target space;
a memory configured to store a sound learning model; and
a processor configured to:
generate a first set of sub sounds by dividing the input sound according to a first predetermined time interval;
determine at least one repeated matching relationship between repeated sub sounds of the first set of sub sounds based on similarity; and
extract a repeated sound pattern generated in the target space based on the determined at least one repeated matching relationship.

13. The sound analysis apparatus of claim 12, wherein the processor is further configured to train the sound learning model using the repeated sound pattern.

14. The sound analysis apparatus of claim 12, wherein the processor is further configured to:
obtain another input sound generated in the target space;
generate a third set of sub sounds by dividing the another input sound according to a third predetermined time interval; and
identifying the repeated sound pattern from the third set of sub sounds using the sound learning model.

15. The sound analysis apparatus of claim 14, wherein the processor is further configured to classify the repeated sound pattern as a noise of the target space.

* * * * *